US011521115B2

(12) United States Patent
Weider et al.

(10) Patent No.: US 11,521,115 B2
(45) Date of Patent: *Dec. 6, 2022

(54) METHOD AND SYSTEM OF DETECTING DATA IMBALANCE IN A DATASET USED IN MACHINE-LEARNING

(71) Applicant: MICROSOFT TECHNOLOGY LICENSING, LLC, Redmond, WA (US)

(72) Inventors: Christopher Lee Weider, Redmond, WA (US); Ruth Kikin-Gil, Bellevue, WA (US); Harsha Prasad Nori, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 339 days.

This patent is subject to a terminal disclaimer.

(21) Appl. No.: 16/424,314

(22) Filed: May 28, 2019

(65) Prior Publication Data
US 2020/0380399 A1    Dec. 3, 2020

(51) Int. Cl.
*G06N 20/00* (2019.01)
*G06F 16/28* (2019.01)

(52) U.S. Cl.
CPC .......... *G06N 20/00* (2019.01); *G06F 16/285* (2019.01)

(58) Field of Classification Search
CPC .............................. G06N 20/00; G06F 16/285
See application file for complete search history.

(56) References Cited

U.S. PATENT DOCUMENTS

| 5,862,325 | A | * | 1/1999 | Reed ...................... H04L 67/55 709/212 |
| 7,318,051 | B2 | | 1/2008 | Weston et al. |
| 8,260,810 | B2 | | 9/2012 | Hisanaga et al. |
| 8,412,651 | B2 | | 4/2013 | Paiva et al. |
| 8,473,519 | B1 | | 6/2013 | Siddiqui et al. |
| 9,838,407 | B1 | | 12/2017 | Oprea et al. |
| 9,916,540 | B2 | | 3/2018 | Shoaib et al. |
| 9,984,219 | B2 | * | 5/2018 | Chaar ................. G06F 3/04186 |

(Continued)

FOREIGN PATENT DOCUMENTS

| EP | 3483797 A1 | 5/2019 |
| WO | 32095534 A2 | 11/2002 |
| WO | 2020055580 A1 | 3/2020 |

OTHER PUBLICATIONS

Grier, 2005.*

(Continued)

*Primary Examiner* — Michael I Ezewoko
(74) *Attorney, Agent, or Firm* — NovoTechIP International PLLC

(57) ABSTRACT

A method and system for detecting imbalanced distribution of data that may signal bias in a dataset associated with training a machine-learning (ML) model includes receiving a request to perform data imbalance detection on the dataset associated with training the machine-learning (ML) model, identifying a feature of the dataset for which data imbalance detection is to be performed and examining the dataset to determine a distribution of the feature across the dataset. The result of the determination may then be presented in a user interface element to help identify data imbalance in the dataset.

10 Claims, 12 Drawing Sheets

(56) References Cited

U.S. PATENT DOCUMENTS

| | | |
|---|---|---|
| 10,354,205 B1 | 7/2019 | Pham et al. |
| 10,401,275 B2 | 9/2019 | Kavsek et al. |
| 10,546,232 B2 | 1/2020 | Guo et al. |
| 10,861,028 B2 * | 12/2020 | Silberman ............... G06N 5/025 |
| 10,990,901 B2 * | 4/2021 | Deo ........................ G06N 20/20 |
| 11,062,792 B2 * | 7/2021 | Grouchy ................ G01N 33/50 |
| 11,256,959 B2 | 2/2022 | Iyer et al. |
| 11,327,655 B2 | 5/2022 | Kirkpatrick |
| 11,327,675 B2 | 5/2022 | Swamy et al. |
| 11,327,992 B1 | 5/2022 | Batsakis et al. |
| 2013/0097103 A1 | 4/2013 | Chari et al. |
| 2015/0088791 A1 | 3/2015 | Lin et al. |
| 2017/0270429 A1 | 9/2017 | Bhattacharya et al. |
| 2017/0330058 A1 | 11/2017 | Silberman et al. |
| 2019/0147371 A1 | 5/2019 | Deo et al. |
| 2019/0228006 A1 * | 7/2019 | Tormasov .............. H04L 9/3239 |
| 2020/0081865 A1 * | 3/2020 | Farrar ................... G06K 9/6218 |
| 2020/0167653 A1 * | 5/2020 | Manjunath ............. G06N 7/005 |
| 2020/0184423 A1 | 6/2020 | Mcenroe et al. |
| 2020/0226489 A1 | 7/2020 | Li et al. |
| 2020/0285898 A1 | 9/2020 | Dong |
| 2020/0302524 A1 * | 9/2020 | Kamkar ................. G06N 3/084 |
| 2020/0380309 A1 | 12/2020 | Weider et al. |
| 2020/0380310 A1 | 12/2020 | Weider et al. |
| 2020/0380398 A1 | 12/2020 | Weider et al. |

OTHER PUBLICATIONS

Edelman, 2008.*
Wirth, 1976.*
Dam, 2013.*
Goffman, 1974.*
Kuhn, 1962.*
Hayles, 2005.*
Lakoff, 1980.*
Mindell, 2015.*
Treffert, 2010.*
Friedler, 2016.*
Kleinberg, 2017.*
Li, Apr. 2019.*
Bionformatics_The_Machine_Learning_Approach_Baldi_MIT_Press_1999_pp. xi-5.*
Buolamwini_Proceedings_of_Machine_Learning_Research_81_2018_pp. 1-15.*
Mind_Over_Machine_Drefus_Macmillan_1986_pp. 1-66.*
Practical_Wisdom_Schwartz_Penguim_2010_pp. 81-154.*
Selbst_Association_for_Computing_Machinery._2019_pp. 59-68.*
The_Hidden_Biases_in_Big_Data_Kate_Crawford_Harvard_Business_Review_2013_pp. 1-5.*
Tidy Data, Wickham, Journal of Statistical Software, 2014, pp. 1-23.*
Wachter_Harvard_Journal_of_Law_Technology_2018_pp. 841-887.*
What_Computers_Can_t_Do_Dreyfus_Harper_Row_1972_pp. 75-117.*
Adebayo, 2016.*
Cabrera, Apr. 2019 (Ángel Alexander Cabrera, Will Epperson, Fred Hohman, Minsuk Kahng, Jamie Morgenstern, Duen Horng Chau: FairVis: Visual Analytics for Discovering Intersectional Bias in Machine Learning. arXiv preprint (Apr. 2019). arXiv: 1904.05419 or or arXiv:1904.05419v1).*
Chung, 2018.*
Fernández, 2018.*
"Fairness: Identifying Bias", Retrieved From: https://developers.google.com/machine-learning/crash-course/fairness/identifying-bias?, Apr. 18, 2019, 6 Pages.
Wexler, James, "Google AI Blog: Facets: An Open Source Visualization Tool for Machine Learning Training Data", Retrieved from https://ai.googleblog.com/2017/07/facets-open-source-visualization-tool.html, Jul. 17, 2017, 6 Pages.
Cabrera, et al., "FAIRVIS: Visual Analytics for Discovering Intersectional Bias in Machine Learning", In Repository of arXiv:1904.05419v1, Apr. 10, 2019, 10 Pages.
Kraska, Tim, "Northstar: An Interactive Data Science System", In Proceedings of the VLDB Endowment, vol. 11, No. 12, Aug. 1, 2018, pp. 2150-2164.
Li, et al., "REPAIR: Removing Representation Bias by Dataset Resampling", In Repository of arXiv:1904.07911v1, Apr. 16, 2019, 10 Pages.
"International Search Report and Written Opinion Issued in PCT Application No. PCT/US2020/029034", dated Aug. 3, 2020, 12 Pages.
"Notice of Allowance Issued in U.S. Appl. No. 16/424,253", dated Mar. 17, 2022, 21 Pages.
"International Search Report and Written Opinion Issued in PCT Application No. PCT/US20/028385", dated Jul. 22, 2020, 9 Pages.
"Notice of Allowance Issued in U.S. Appl. No. 16/424,253", dated Apr. 28, 2022, 16 Pages.
"Final Office Action Issued in U.S. Appl. No. 16/424,371", dated Oct. 27, 2021, 25 Pages.
"First Action Interview Office Action Issued in U.S. Appl. No. 16/424,371", dated May 27, 2021, 5 Pages.
"Non Final Office Action Issued in U.S. Appl. No. 16/424,371", dated Apr. 20, 2022, 20 Pages.
"Preinterview First Office Action Issued in U.S. Appl. No. 16/424,371", dated Feb. 8, 2021, 5 Pages.
"Notice of Allowance Issued in U.S. Appl. No. 16/424,412", dated May 19, 2022, 9 Pages.
Batista, et al., "A Study of the Behavior of Several Methods for Balancing Machine Learning Training Data", In Journal of ACM Sigkdd Explorations, vol. 6, Issue 1, Jun. 1, 2004, pp. 20-29.
Zadrozny, Bianca, "Learning and Evaluating Classifiers under Sample Selection Bias", In Proceedings of the Twenty-First International Conference on Machine Learning, Jul. 4, 2004, 8 Pages.
Kamiran, et al., "Data Preprocessing Techniques for Classification without Discrimination", In Journal of Knowledge and Information Systems, vol. 33, Issue 1, Oct. 1, 2012, 33 Pages.
"International Search Report and Written Opinion Issued in PCT Application No. PCT/US20/028904", dated Aug. 4, 2020, 11 Pages.
"International Search Report and Written Opinion Issued in PCT Application No. PCT/US20/028905", dated Jul. 24, 2020, 11 Pages.
"Notice of Allowance Issued in U.S. Appl. No. 16/424,412", dated Aug. 15, 2022, 7 Pages.
"Notice of Allowance Issued in U.S. Appl. No. 16/424,253", dated Aug. 22, 2022, 11 Pages.
"Final Office Action Issued in U.S. Appl. No. 16/424,371", dated Aug. 23, 2022, 27 Pages.
Webster, Merriam, "Definition of "Bayesian"", Retrieved from: https://web.archive.org/web/20181228121014/https://www.merriam-webster.com/dictionary/Bayesian, Dec. 28, 2018, 8 Pages.
Chouldechova, et al.," The Frontiers of Fairness in Machine Learning", In repository of arXiv: 1810.08810v1, Oct. 20, 2018, pp. 1-13.
Cortes, et al., "Sample Selection Bias Correction Theory", In proceedings of International Conference on Algorithmic Learning Theory, Oct. 13, 2008, 16 Pages.
Webster, Merriam, "Definintion of "Mitigate"", Retrieved from: https://web.archive.org/web/20190329114351/https://www.merriam-webster.com/dictionary/mitigate, Mar. 19, 2019, 12 Pages.
"Office Action Issued in European Patent Application No. 20725011.9", dated Aug. 18, 2022, 6 Pages.

* cited by examiner

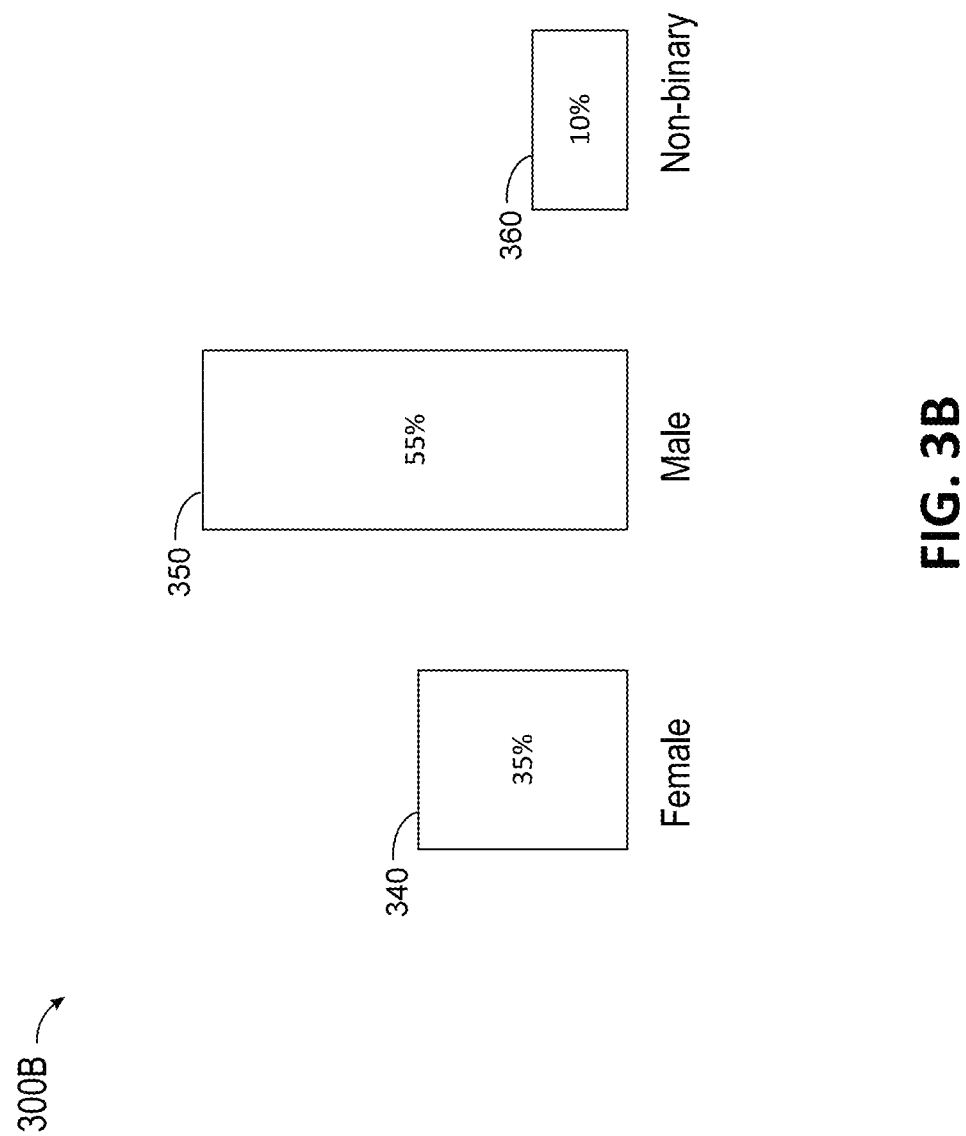

400B

METHOD AND SYSTEM OF DETECTING DATA IMBALANCE IN A DATASET USED IN MACHINE-LEARNING

CROSS-REFERENCE TO A RELATED APPLICATION

This patent application is related to co-pending, commonly-owned U.S. patent application Ser. No. 16/424,371 entitled "Method and System of Correcting Data Imbalance in a Dataset Used in Machine-Learning," U.S. patent application Ser. No. 16/424,412 entitled "Method and System of Performing Data Imbalance Detection and Correction in Training a Machine-Learning Model," and U.S. patent application Ser. No. 16/424,253 entitled "Remote Validation of Machine-Learning Models for Data Imbalance," which are all incorporated herein by reference in their entirety.

BACKGROUND

In recent years, machine learning techniques are increasingly used in training machine learning models that provide functionalities in everyday life. These functionalities may have consumer related applications or may be used by institutions and organizations in automating decisions that were traditionally made by humans. For example, banks may use machine learning models to determine loan approvals, credit scoring or interest rates. Other institutions may utilize machine learning models to make hiring decisions, salary and bonus determinations and the like, Machine learning models may be used in making decisions in many other instances that have significant implications in people's lives. These machine learning models are often trained using large datasets that are collected in a variety of different manners by people or institutions. For example, researchers conducting research or organizations that are in the business of collecting data are some of the entities that may provide datasets for training machine leaning models.

The process of collecting data, however, often introduces bias in the dataset. For example, most datasets are skewed heavily towards a certain type of demographic. This may be because of bias in the way data is collected by the data collector or simply because data relating to certain demographics are more readily available. Regardless of how bias is introduced in a dataset, the results can be harmful. For example, if the dataset does not include as many female datapoints as male datapoints, the machine leaning model trained based on this dataset may produce results that are more favorable to males. When machine learning models are used to make important decisions, such biases can have significant implications for people.

Hence, there is a need for improved systems and methods of identifying bias in datasets used in machine learning techniques.

SUMMARY

In one general aspect, this disclosure presents a device having a processor and a memory in communication with the processor wherein the memory stores executable instructions that, when executed by the processor, cause the device to perform multiple functions. The functions may include receiving a request to perform data imbalance detection on the dataset associated with training the machine-learning (ML) model, identifying a feature of the dataset for which data imbalance detection is to be performed and examining the dataset to determine a distribution of the feature across the dataset. The result of the determination may then be presented in a user interface element to help identify data imbalance in the dataset.

In yet another general aspect, the instant application describes a method for detecting data imbalance in a dataset associated with training a ML model. The method may include receiving a request to perform data imbalance detection on the dataset associated with training the machine-learning (ML) model, identifying a feature of the dataset for which data imbalance detection is to be performed and examining the dataset to determine a distribution of the feature across the dataset. The result of the determination may then be presented in a user interface element to help identify data imbalance in the dataset.

In a further general aspect, the instant application describes a non-transitory computer readable medium on which are stored instructions that when executed cause a programmable device to receive a request to perform data imbalance detection on the dataset associated with training the machine-learning (ML) model, identify a feature of the dataset for which data imbalance detection is to be performed and examine the dataset to determine a distribution of the feature across the dataset. The result of the determination may then be presented in a user interface element to help identify data imbalance in the dataset.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 3A-3C depict example bar charts for displaying distribution in data.

DETAILED DESCRIPTION

Figure 1:
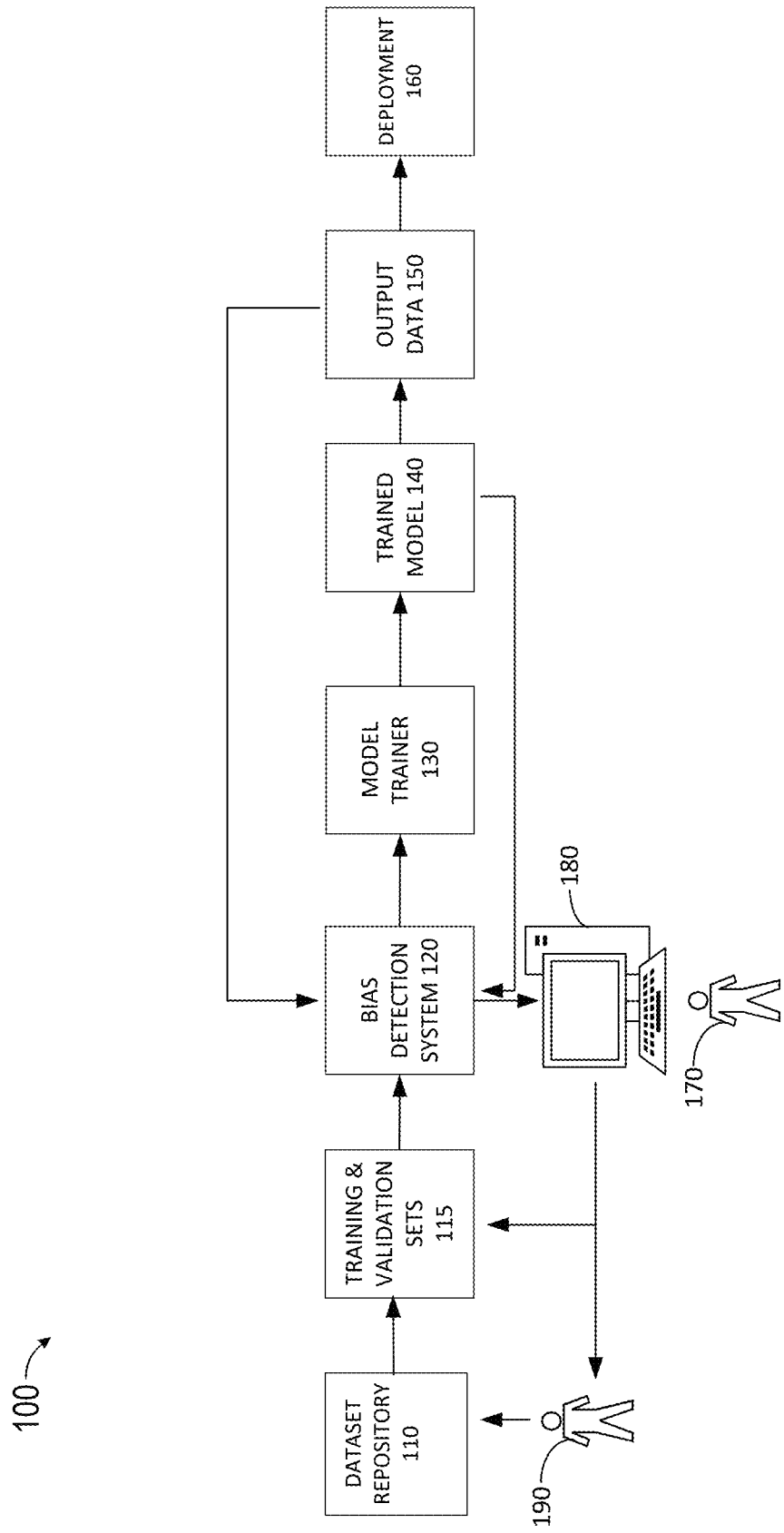
FIG. 1 depicts a simplified example system architecture for detecting and addressing data imbalance in machine learning operations.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Large datasets are increasingly used in order to train machine learning models that provide a variety of functionalities. With the significant increase in use of machine learning models in business and personal arenas to automate decision making functions, the contents of such large datasets can significantly affect different aspects of peoples' everyday lives. As a result, undetected bias in a dataset used for training a machine learning model can have significant negative implications on people or institutions the dataset was biased against. For example, if a dataset has a substantially larger number of datapoints for a particular population, the training performed based on such a dataset may heavily skew the trained model in favor of that particular population. This can introduce undesired and at times unknown discrimination against certain populations in the way the trained model makes decisions. Furthermore, data imbalance in a dataset may result in a model that produces incorrect results. For example, if a dataset has one or more features that have missing values for a large number of datapoints, it may be difficult to correlate those features with accurate outcomes. Because of the substantial size of datasets used in model training, it is often difficult to detect certain types of data imbalance in the datasets by manual examination. This is made further complicated by the number of ways in which data imbalance can be introduced during the training process. As a result, data imbalance in training a machine learning model may often go undetected. This may result in significant ethical and/or legal challenges when the model is used to make important decisions that affect people's lives. Furthermore, it may result in models that produce inaccurate results.

To address these issues and more, in an example, this description provides techniques used for detecting data imbalance introduced during training of a machine learning model. In an example, data imbalance can be detected in a dataset by identifying one or more features of the dataset that can introduce bias, determining the classifications with which each feature can be categorized and statistically examining those features to determine if they provide a balanced distribution across the different categories. For example, a database that includes gender as a feature may be examined to determine if the dataset provides a balanced distribution across the male, female and non-binary categories with which gender can be categorized. The resulting distribution may then be reported to a user who can determine if the dataset provides the desired distribution. In an example, the reporting may be done visually by displaying a distribution map in a user interface. The distribution map may help identify gaps in the collected data. Because data imbalance may also be introduced during various stages of model training, data imbalance detection may be performed at each stage. For example, in addition to examining the dataset for an identified feature, the label feature of the dataset, which determines the outcome of the training model, may also be examined to determine if it provides the desired distribution. Furthermore, data imbalance detection may be performed on both the training and validation sets of data to ensure data imbalance is not introduced when the dataset is split into the two different sets for validation purposes. Moreover, outcomes provided by the trained model may be examined to determine if the trained model exhibits bias in its outcomes. As a result, the solution provides a method of easily and efficiently detecting data imbalance in large datasets during the training of a machine learning model.

As will be understood by persons of skill in the art upon reading this disclosure, benefits and advantages provided by such implementations can include, but are not limited to, a solution to the technical problems of inaccurate and/or biased training of machine learning models. Technical solutions and implementations provided here optimize the process of training machine learning models by ensuring that they are unbiased and produce the desired results. The benefits provided by these solutions provide increased accuracy and fairness and provide machine learning models that comply with ethical and legal standards.

As a general matter, the methods and systems described herein may relate to, or otherwise make use of, machine-trained models. Machine learning (ML) generally involves various algorithms that can automatically learn over time. The foundation of these algorithms is generally built on mathematics and statistics that can be employed to predict events, classify entities, diagnose problems, and model function approximations. As an example, a system can be trained in order to identify patterns in user activity, determine associations between various datapoints and make decisions based on the patterns and associations. Such determination may be made following the accumulation, review, and/or analysis of data from a large number of users over time, that may be configured to provide the ML algorithm (MLA) with an initial or ongoing training set.

In different implementations, a training system may be used that includes an initial ML model (which may be referred to as an "ML model trainer") configured to generate a subsequent trained ML model from training data obtained from a training data repository. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network.

Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

FIG. 1 illustrates system architecture 100 for detecting and visualizing bias in machine learning operations. The system 100 may include a dataset repository 110 which includes one or more datasets for training a ML model. Each dataset may include a significant number of queries. In an example the datasets may include tens of thousands of queries. The datasets may be provided by one or more organizations. For example, organizations that collect consumer data as part of their applications may provide data collected by the applications for training ML models. In another example, a dataset may be provided by a researcher conducting research on a population or a scientific subject. For example, health related data may be provided by researchers that conduct research in the medical and health fields and provide their findings in a dataset. Other types of data collection may be employed. For example, polling data may be collected and provided by pollsters, or data relating to specific outcomes may be collected and provided by organizations that wish to use the outcomes to train models that predict more desirable outcomes. For example, banks may collect data on loan defaults and circumstances that lead to defaults to train a ML model that determines if a person qualifies for a loan. In another example, non-human data may be collected and provided by organizations that work in a field. For example, temperature readings from a large set of automated sensors may be collected in a dataset and used to train a ML model for predicting conditions that correspond with temperature changes. In one implementation, the training datasets may be continually updated as more data becomes available. It should be noted that the dataset can include tabular and non-tabular data. For example, dataset including image or voice data may be used to train facial recognition or voice recognition ML models. The dataset repository 110 may be stored in a cloud environment or one or more local computers or servers.

To comply with privacy and security regulations and ethical guidelines, the datasets may be anonymized and generalized to ensure they do not expose a person's private information. However, even if a dataset does include some private information, the bias detection system 120 may only retain facets of the data that are anonymized and generalized as a distribution curve such that there is no connection between the final results and any specific data point that contributed to it.

Once a dataset is ready to be used in training a ML model, the data included in the dataset may be divided into training and validation sets 115. That is because when a model is trained on a certain set of data, the data may be split into a training subset and a validation subset. This is to determine whether the model is accurately processing data it has not seen before. The process may involve training the model on the training subset of data, and then providing the trained model the validation subset of data as input to determine how accurately the model predicts and classifies the validation data. The predictions and classifications may then be compared to the labels already determined by the validation dataset to determine their accuracy.

Once the subsets have been prepared, the dataset 110 may be examined by a bias detection system 120 to determine if any undesired bias exists in the dataset. The bias detection system 120 may be provided as a service that can access and statistically examine a dataset to identify bias and/or imbalanced data. Furthermore, the bias detection system 120 may be provided as a tool integrated into one or more applications that process data. The bias detection system 120 may be accessible via a computer client device 180 by enabling a user 170 to provide input, execute a bias and/or imbalanced data detection operation and/or view the results of the bias and/or imbalanced data detection operation via one or more user interfaces. The user 170 may be a person(s) responsible for managing the ML training or any other user of a dataset in the dataset repository 110.

The bias detection system 120 may be used to detect bias and/or imbalanced data in the original dataset in addition to identifying bias and/or imbalanced data in other subsets of data, such as training and validation subsets 115, used to train a model. That is because while many automated techniques for splitting the data set into training and validation datasets make an attempt to provide a good distribution of data in both datasets, the techniques do not check for or ensure that no bias and/or imbalanced data is introduced during the splitting process. Checking for bias and/or imbalanced data before training is thus an important part of producing low-bias ML models, as bias and/or imbalanced data in the training data may introduce outcome bias or outcome inaccuracy in the model, and bias in the validation data may miss or overemphasize bias in the outcomes.

In one implementation, a user 190 may be notified of bias and/or imbalanced data detected by the bias detection system 120 via for example the user 170. The user 190 may represent a researcher or any other person or organization responsible for collecting data as part of a dataset used in the system 100. The notification may include information about the types of bias and/or imbalanced data identified in the dataset to enable the user 190 to collect data that fills the gaps identified by the bias detection system 120. For example, if the bias detection system determines that the dataset does not include enough data entries for people of color, user 190 may be notified of this unbalanced distribution such that they can begin collecting more data that represents people of color. Thus, the bias detection system 120 may operate as a feedback mechanism to help researchers and data collectors collect more inclusive data. The more inclusive data may then be added to the dataset which may once again be examined via the bias detection system 120 to ensure a more balanced distribution has been achieved and/or some other bias was not introduced in the process.

Once a dataset in the dataset repository 110 is examined by the bias detection system 120 and determined to be appropriate for training, then the dataset may be used by a model trainer 130 to train a trained model 140. The model trainer 130 can be any machine learning training mechanism known in the art and used for training ML models. After the training process is complete, then the trained model 140 may be used to generate output data 150, which may then be examined by the bias detection system 120 to ensure the outcome does not show signs of bias or inaccuracy. That is because, even with unbiased input data, a model may be trained to deliver biases in outcome. For example, even if the input dataset includes an equal number of men and women, a trained model may rate more men than women good credit risks because of hidden associations in the data, because of a label imbalance (e.g., more men in the input dataset are labeled as good risks even though overall there are just as many good risks as bad risks in the input data), or because of the validation dataset having a different distribution in key features than the training dataset. Thus, even if the input dataset is examined and approved as unbiased, it may be important to examine the outcome data to ensure that the outcome is also unbiased or low-biased. As a result, the output data 150 may be provided to the bias detection system 120 to identify bias in the outcome. If and when undesired bias is identified in the output data 150, the user 170 may determine what changes can be made to the input dataset to better train the model to address the identified bias. Once the model is determined to be unbiased or low-biased within a threshold of desired distribution, then the trained model may be deployed for use in the real-world via deployment mechanism 160.

Figure 2:
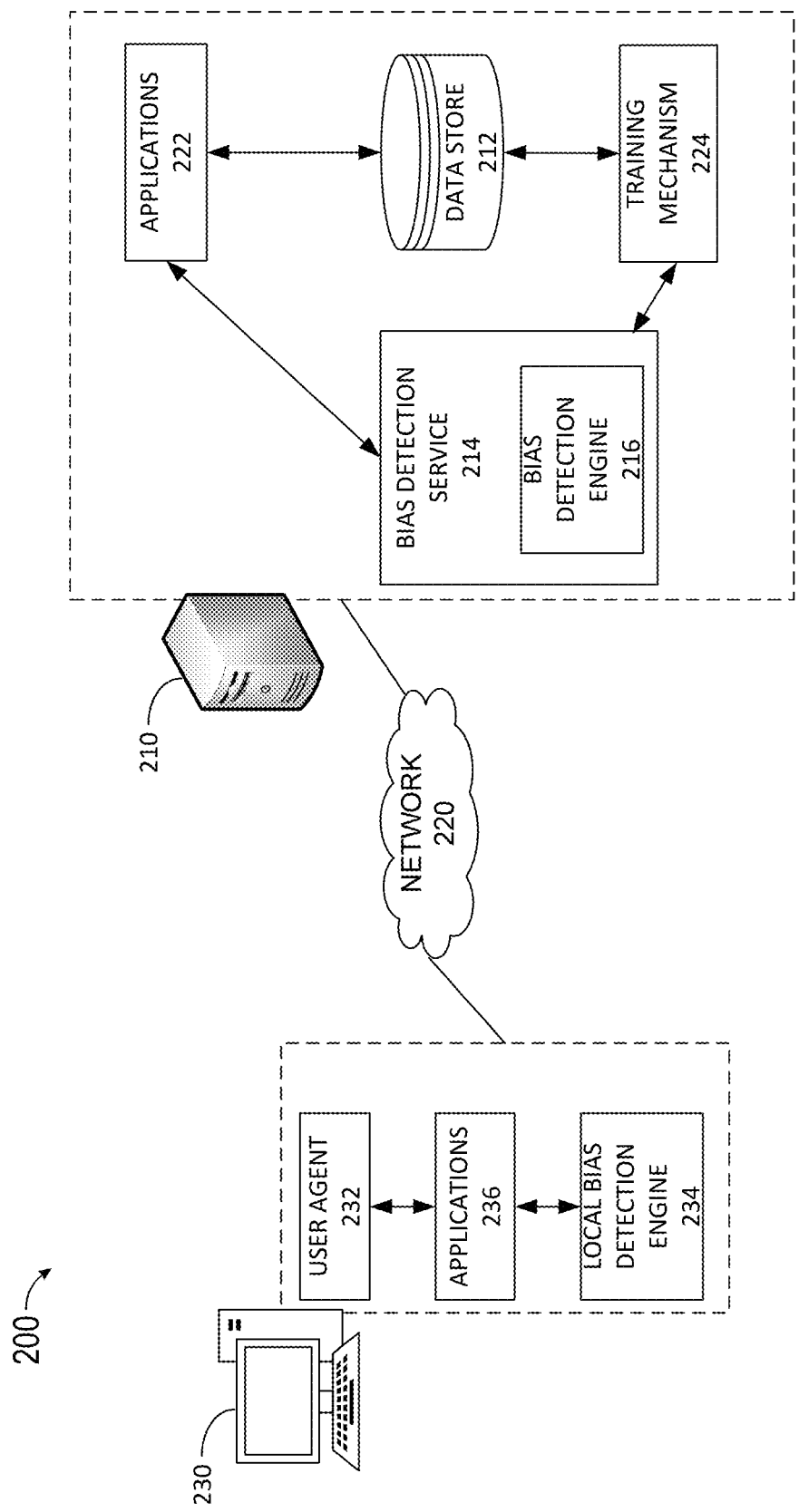
FIG. 2 depicts an example environment upon which aspects of this disclosure may be implemented.

FIG. 2 illustrates an example environment 200 upon which aspects of this disclosure may be implemented. The environment 200 may include a server 210 which may be connected to or include a data store 212 that may function as a repository in which datasets used for training ML models may be stored. The server 210 may operate as a shared resource server located at an enterprise accessible by various computer client devices such as client device 230. The server may also operate as a cloud-based server for bias detection services in one or more applications such as applications 222.

The server 210 may also include and/or execute a bias detection service 214 which may provide intelligent bias and/or imbalanced data detection for users utilizing applications that include data processing and visualization or access to ML training mechanisms on their client devices such as client device 230. The bias detection service 214 may operate to examine data processed or viewable by a user via an application (e.g., applications 222 or applications 236), identify bias and/or imbalanced data in specific features of the data, report the detected bias and/or imbalanced data to the user and/or visualize the bias and/or imbalanced data. In one implementation, the process of detecting bias and/or imbalanced data in a dataset is performed by a bias detection engine 216.

Datasets for which bias is examined and detected by the bias detection service may be used for training ML models by a training mechanism 224. The training mechanism 224 may use training datasets stored in the datastore 212 to provide initial and/or ongoing training for ML models. In one implementation, the training mechanism 224 may use labeled training data from the datastore 212 to train the ML models. The initial training may be performed in an offline or online stage. In another example, the training mechanism 224 may utilize unlabeled training data from the datastore 212 to train the ML model via an unsupervised learning mechanism. Unsupervised learning may allow the ML model to create and/or output its own labels. In an example, an unsupervised learning mechanism may apply reinforcement learning to maximize a given value function or achieve a desired goal.

The client device 230 may be connected to the server 210 via a network 220. The network 220 may be a wired or wireless network(s) or a combination of wired and wireless networks that connect one or more elements of the environment 200. The client device 230 may be a personal or handheld computing device having or being connected to input/output elements that enable a user to interact with various applications (e.g., applications 222 or applications 236) and services. Examples of suitable client devices 230 include but are not limited to personal computers, desktop computers, laptop computers, mobile telephones; smart phones; tablets; phablets; smart watches; wearable computers; gaming devices/computers; televisions; and the like. The internal hardware structure of a client device is discussed in greater detail in regard to FIGS. 7 and 8. It should be noted that client device 230 is representative of one example client device for simplicity. Many more client devices may exist in real-world environments.

The client device 230 may include one or more applications 236. Each application 236 may be a computer program executed on the client device that configures the device to be responsive to user input to allow a user to interact with a dataset. The interactions may include viewing, editing and/or examining data in a dataset. Examples of suitable applications include, but are not limited to, a spreadsheet application, a business analytics application, a report generating application, ML training applications, and any other application that collects and provides access to data. Each of the applications 236 may provide bias and/or imbalanced data detection either via the local bias detection engine 234 or via the bias detection service 214. Bias and/or imbalanced data detection may be integrated into any of the applications 236 as a tool, for example via an application programming interface (API), that can be provided via the applications 236.

In some examples, applications used for processing, collecting or editing data may be executed on the server 210 (e.g., applications 222) and be provided via an online service. In one implementation, web applications may communicate via the network 220 with a user agent 232, such as a browser, executing on the client device 230. The user agent 232 may provide a user interface that allows the user to interact with applications 222 and may enable applications 222 to provide bias and/or imbalanced data detection as part of the service. In other examples, applications used to process, collect, or edit data with which bias detection can be provided may be local applications such as applications 236 that are stored and executed on the client device 230 and provide a user interface that allows the user to interact with the application. Applications 236 may have access to or display datasets in the data store 212 via the network 220 for example for user review and bias detection. In another example, data stored on the client device 230 and used by applications 236 may be utilized by the training mechanism 224 to train a ML model. In either scenario, bias and/or imbalanced data detection may be provided to examine a dataset and identify bias and/or imbalanced data.

Figure 3A:
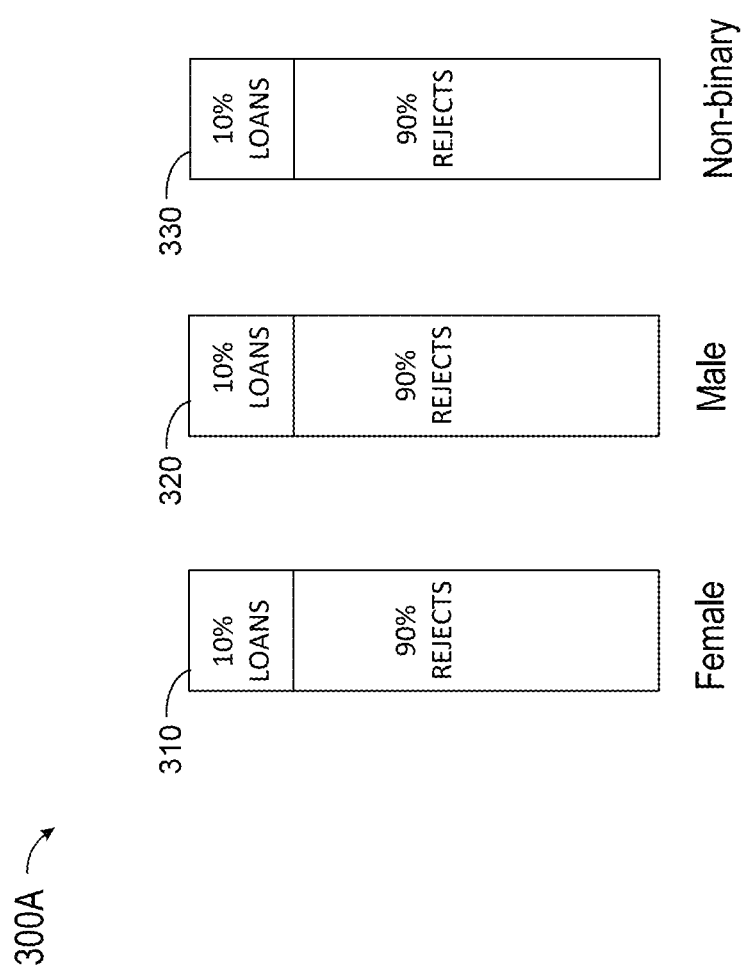

FIGS. 3A-3B depict example bar charts for displaying distribution in data to show how bias can be present in a dataset and affect outcome of a model. FIG. 3A displays a bar chart 300A that depicts an ideal distribution of data in a dataset based on a gender attribute of the dataset. This assumes that one of the attributes of a datapoint in the dataset is gender and gender is categorized by the female, male and non-binary categories. The example also assumes that the dataset is used to train a model for determining loan approvals. For such a dataset, an idea distribution based on gender would result in a female bar 310 that has an equal distribution to the male bar 320 and the non-binary bar 330. This means the number of data entries that represent each of the categories of the gender attribute is equal or within a predetermined distribution threshold. As a result, the percentage of loans approved for people falling into each category may be equal. Thus, the model trained by this dataset generates outcomes that are consistent across the gender spectrum (e.g. 10% of loans submitted by applicants in each category are approved).

Figure 3C:
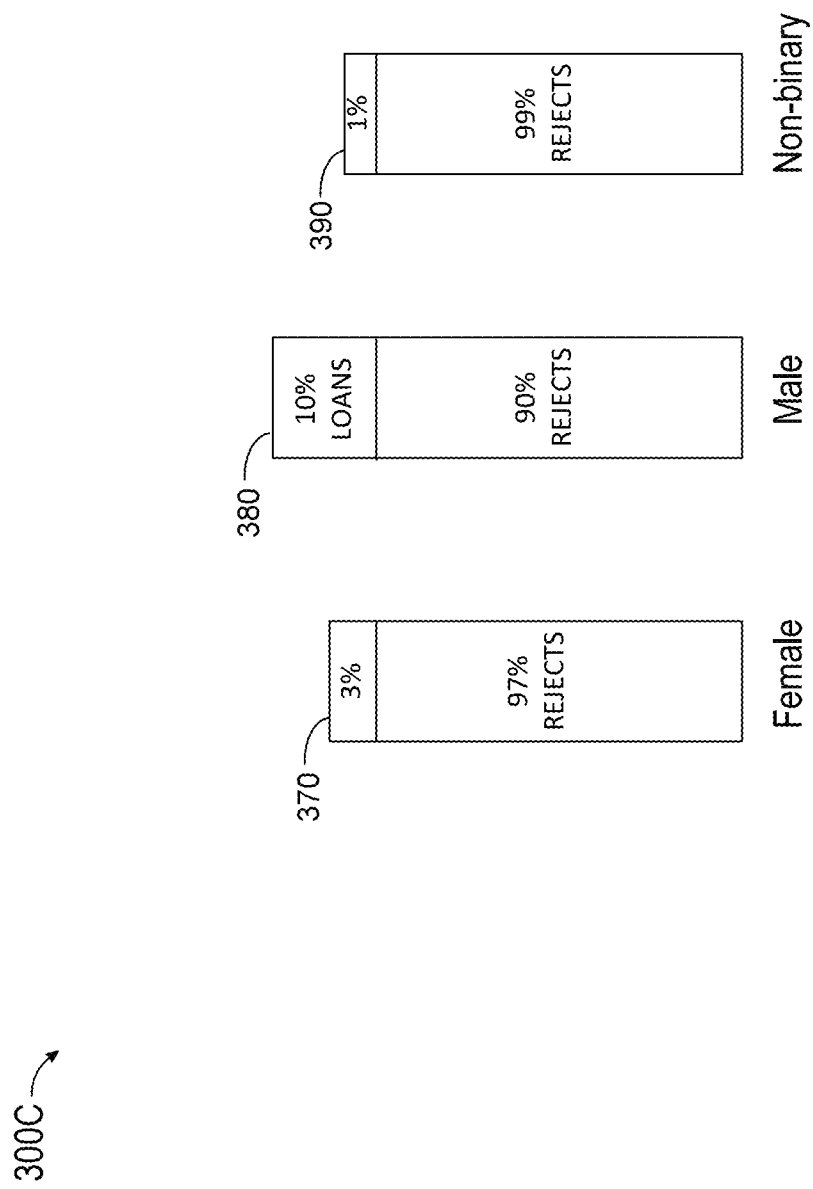

The ideal distribution depicted in FIG. 3A, however, rarely occurs in the real world. Often the dataset is representative of one category more than others. FIG. 3B depicts a bar chart 300B displaying a more realistic distribution of data across the gender spectrum in a dataset. The bar chart 300B shows the female bar 340 represents 35% of the data, while the male bar 350 represents 55% of the data and the non-binary bar chart 360 represents only 10% of data. This shows a clear imbalanced distribution of data across the three categories. When such an imbalanced dataset is used to train a ML mode, the outcome is often severely biased. FIG. 3C depicts a bar chart 300C displaying such an outcome. The female bar 370 of bar chart 300C shows that the ML model rejects 97% of female applicants, while the male bar 380 displays only 3% of the male applicants are rejected by the ML model. As the non-binary bar 390 shows, the percentage of people falling into the non-binary category that are rejected is even higher than the female applicants with a 99% rejection rate. As such, imbalanced or biased distribution of input data in a dataset can significantly impact the outcome produced be a ML model trained with the imbalanced dataset.

Figure 4A:
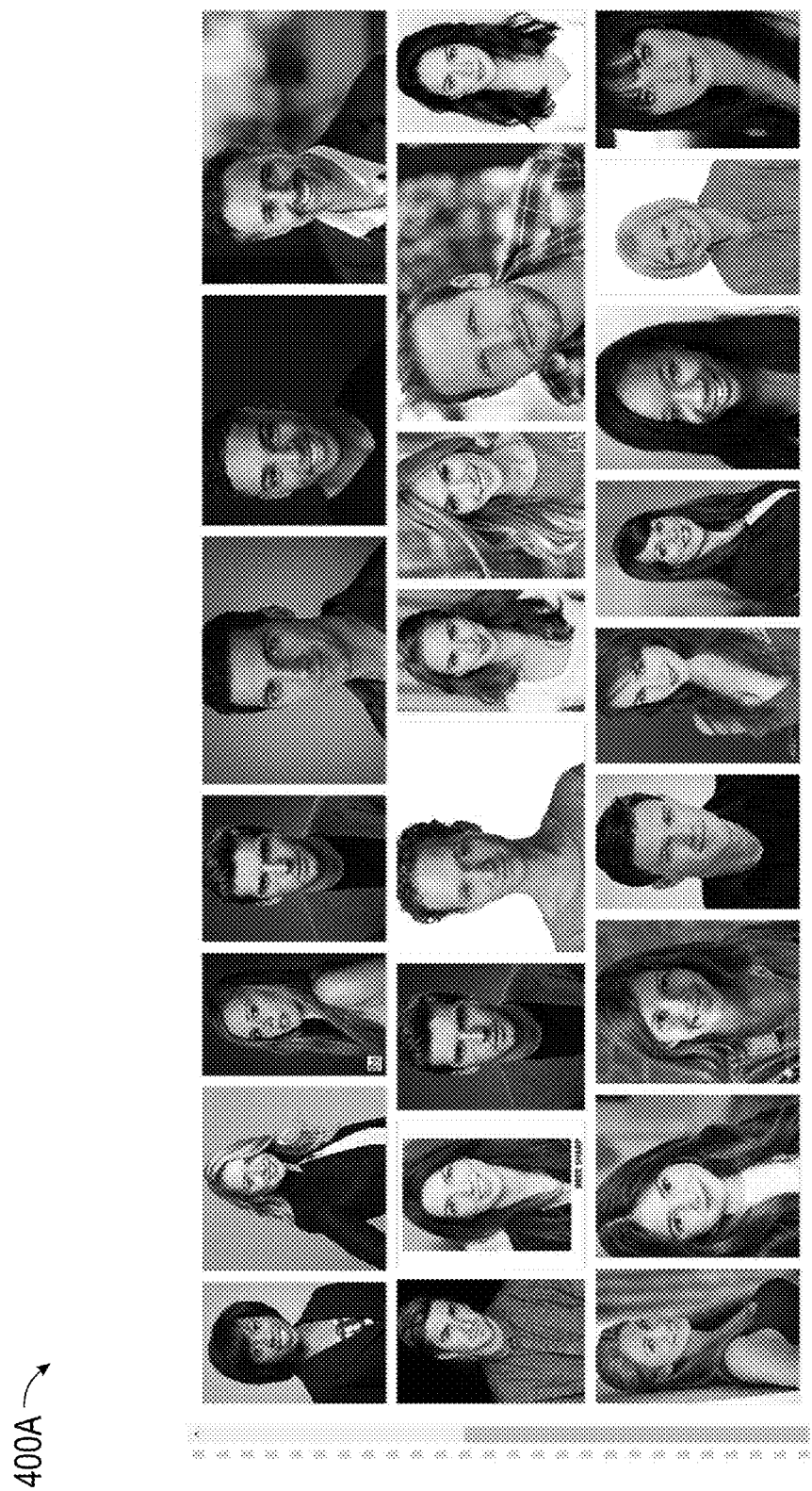
FIG. 4A is an example dataset that can be used to train an example machine learning model.

FIG. 4A depicts an example non-tabular dataset 400A that can be used to train a ML model. The dataset 400A includes images depicting faces of a variety of individuals having different ages, genders, and races. In one implementation, the dataset 400A may be used to train a facial recognition ML model. In order to ensure that the trained model correctly recognizes faces of people having different ages, skin tones and genders, a dataset which provides a balanced distribution of those features may be needed. However, it may be very difficult to determine if the dataset includes a balanced distribution by simply examining the contents of the dataset. This may be particularly true for datasets that include a significant number of data points. The bias detection system, however, can make the determination quickly and efficiently. For example, a user may initiate bias detection by pressing on a menu button on a user interface in an application. As discussed above, the bias detection tool may be integrated into one or more applications. In another example, bias detection may be provided as a standalone application or service. In either case, a user interface may enable a user to initiate bias detection by selecting a dataset on which bias detection should be performed. Subsequently, the user may be prompted to enter an attribute of the dataset for which bias and/or imbalanced in data should be checked. For example, for the dataset 400A, the user may select skin tone as the attribute for which bias is examined. Once the dataset is examined for bias, the results may be displayed in a visualization interface to enable the user to quickly identify gaps in data and areas which may need improvement.

Figure 4B:
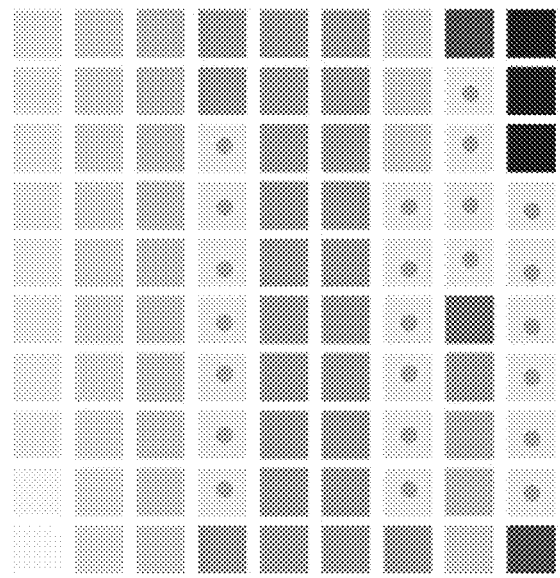
FIG. 4B depicts an example method of visualizing bias in a dataset.

FIG. 4B depicts an example method of visualizing imbalance distribution of data in a dataset such as the dataset 400A of FIG. 4A. When bias detection is performed based on a skin tone attribute on a dataset such as dataset 400A, the results of the bias examination may be visualized for a user's easy reference in a skin tone map 400B. The skin tone map 400B may display a colored box (with a color corresponding to the represented the skin tone) for each skin tone for which the dataset includes a distribution above a predetermined threshold, while displaying a box with a dot for all skin tones for which a distribution above the predetermined threshold is not present in the dataset. This can enable a person to determine quickly and at a glance what skin tones are not fairly represented in the dataset. For example, the skin tone map 400B may show that quite a few darker skin tones are not represented adequately in the dataset indicating that the dataset as a whole is skewed toward lighter skin tones. To present the skin tone map 400B, the bias detection system may include or have access to a directory of possible skin tones. Alternatively, the possible skin tones may be provided to the bias detection system as an input.

Figure 5A:
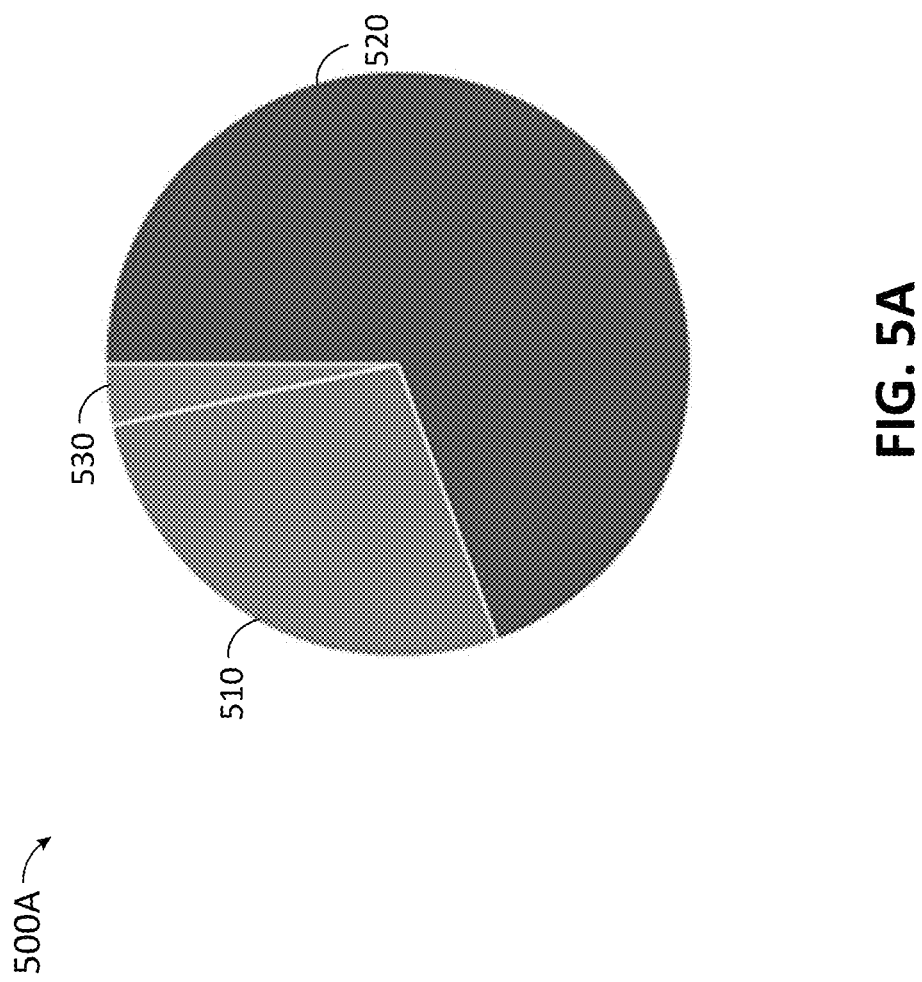
FIGS. 5A-5B depict more example methods of visualizing bias in a dataset.
Figure 5B:
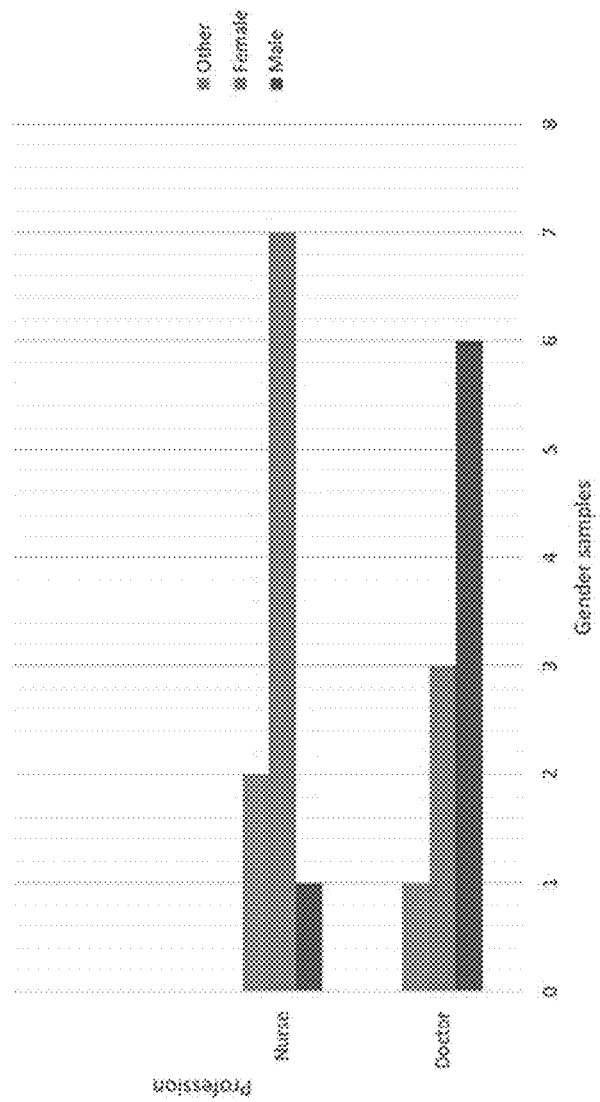

FIGS. 5A-5B depict alternative interfaces for visualizing bias in a dataset. FIG. 5A depicts an example pie chart 500A for displaying feature distribution of data in a dataset. For a bias detection process in which the dataset was examined based on the feature of gender, the pie chart 500A may display percentage of each of the categories for the gender feature. For example, portion 520 of the pie chart 500A may represent percentage of male datapoints in the dataset, while portion 510 may represent the percentage of female datapoints and portion 530 may represent the percentage of non-binary data points. In one implementation, each of the three portions may be displayed in a different color for easy distinction. A quick glance at the pie chart 500A can reveal that this dataset is heavily imbalanced with respect to gender. A user viewing the dataset may then decide how to proceed based on the information.

FIG. 5B depicts an alternative visualization interface 500B for displaying feature bias in a dataset. Visualization interface 500B displays a clustered chart for distribution of data in two correlated features. This may be useful as sometimes the importance of one piece of data is revealed more clearly when compared to a second one. Thus, the bias detection system could cross-reference data of different features to examine distributions across the correlated features. For example, as shown in FIG. 5B gender and profession features can be correlated to identify the distribution of gender in each profession.

By visualizing the resulting distribution in a clustered chart, a user can quickly determine that the dataset includes too many male doctors and too few male nurses. Cross referencing can be used in a variety of other combination of features. For example, zip codes may be correlated with skin tone to determine if a fair distribution of skin tones is provided across each zip code. To determine fairness, the distribution of skin tone in a zip code may be compared with data representative of the real population of the zip code to identify if they correspond. For example, if census data shows that a zip code has a 10% African American population, while the distribution of dark skin tone in the zip code in the dataset is only 3%, the dataset may not provide a fair distribution of dark skin tones in that zip code.

While FIGS. 5A-5B display a pie chart and a clustered chart, many more types of charts and reports may be used to visualize detected bias. In one implementation, the type of visualization interface used to visualize the distribution in one or more features may be selected by the user. For example, the bias detection tool may provide an option for the user to choose how to view the results. Options may include a written report, a variety of charts such as a scatter chart, a clustered column chart, a clustered bar chart, a line chart, a stacked column chart, a stacked bar chart, a pie chart, and a distribution map such as a skin tone map. Alternatively, the type of visualization interface used may depend on the underlying application within which the bias detection is provided and/or may be selected by the bias detection system based on one or more parameters such as the type of feature for which distribution is being shown. For example, for a feature such as gender which only includes three categories, a stacked column chart may be used, while for a feature such as skin tone, a skin tone map may be utilized. Thus, in one implementation, the bias detection system can choose the type of visualization interface used based on predetermined or learned parameters. In an example, the type of visualization interface used may be changeable by the user. For example, if the pie chart 500A of FIG. 5A is used to display the distribution of gender, the user may decide that a stacked column chart better shows the results and can choose to change the visualization interface to the stacked column chart from a user interface of the application providing the bias detection tool.

Figure 6:
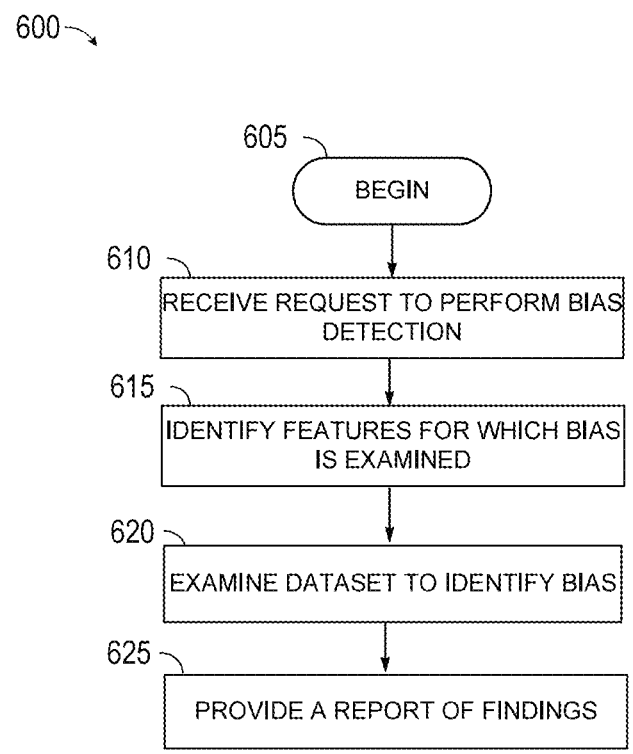
FIG. 6 is a flow diagram depicting an example method for detecting data imbalance in a dataset associated with training a ML model.

FIG. 6 is a flow diagram depicting an example method 600 for detecting bias and/or imbalanced data in datasets associated with training a ML model. The method 600 may begin, at 605, and proceed to receive a request to perform a bias and/or imbalanced data detection operation, at 610. The request may be received via a user interface of an application that provides a bias detection tool. For example, it may be received via a menu button of a user interface associated with a data processing application (e.g., a spreadsheet application such as Microsoft Excel®). This may be done, by a user prior to initiating a ML training procedure. Alternatively, it may be done by a data collector or researcher in trying to determine if a dataset meets certain requirements before providing the dataset as a training dataset for model training. In one implementation, the request may be received via a user interface of a standalone data bias detection service or application. In another example, the request may be received as an initial step of ML training. For example, an ML training algorithm may include an initial stage for detecting bias.

In one implementation, the request may include an indication identifying the dataset or subset(s) of the dataset for which bias detection is requested. For example, if the request is received via a standalone local bias detection tool, it may identify a dataset stored in a data store or locally to which the bias detection tool has access for performing the bias detection operations. The bias detection tool may provide a user interface element for enabling the user to identify the dataset for performing bias detection. For example, a user interface allowing the user to browse to a desired dataset may be presented to the user as part of the bias detection process. In one implementation, the user may be able to select the entire dataset or a subset of it. For example, the user may be able to select the training and validation subsets of data for a dataset for which a split in data has already been performed for model training. Alternatively, when a dataset is selected for performing bias detection, any identified subsets of the dataset may automatically be examined for bias and/or imbalance in data.

Once the request for performing bias detection is received, method 600 may proceed to identify one or more features of the dataset for which bias and/or imbalance in data should be examined, at 615. In one implementation, the one or more features may be selected by a user. For example, the bias detection tool may provide a user interface for choosing features of the dataset for which bias and/or imbalance in data will be checked. This may be presented as a list of options (based on available features of the dataset) for the user to choose from. Alternatively, the user may enter (e.g., by typing the name of the feature, or by clicking on a column heading of the dataset for a column displaying a desired feature, and the like) the desired feature(s) in a user interface element. In an example, the user may specify two or more features for which cross-correlation is desired. In addition to identifying the feature(s), the user may also specify a desired threshold for determining whether the data is balanced to within the desired threshold for each feature. The desired threshold may be the same or it may be different for each identified feature.

In an alternative implementation, the features may be automatically and/or intelligently identified by the bias detection tool. For example, the bias detection tool may examine the dataset and determine if the dataset includes any features in a list of common features that are known to have ethical implications if the data distribution is not balanced. For example, the common features may include gender, race, sexual orientation, and age. In an example, the bias detection tool may examine the contents of the dataset and/or the type of ML model for which the dataset may be used to determine what feature(s) may be most appropriate for identifying bias. For example, race may be a more important feature to examine in a dataset that may be used to determine a ML learning used in crime detection to ensure the dataset is balanced and unbiased with respect to race. The determination of what features to use for examining bias may be made based on multiple parameters that may be stored in a database accessible to the bias detection tool.

In one implementation, the labels feature may be also selected as a feature to examine bias for. That is because bias and/or imbalance in data can easily be introduced in ML training via an imbalanced label. In general, in order for ML models to classify or predict binary or multi-class information, such as whether a face is male or female, or whether a given person is a good credit risk for an unsecured loan, the training data may include a label that specifies which class a given record falls into. This data may then be used to teach the ML model which category to apply to new input. In other words, the label data may teach the ML model which label to apply to new input. Thus, an imbalanced label may result in an inaccurate or biased ML model. For example, for an ML model designed to distinguish cats from dogs in pictures, having two few datapoints that are labeled as cats in the training dataset may result in the trained model not being able to accurately classify cats. Thus, in addition to identifying common features that introduce bias in a dataset, the label may also be identified as a feature to be examined.

Once the features for which bias should be examined are identified, method 600 may proceed to access the dataset(s) and examine the dataset(s) to identify bias and/or imbalanced data, at 620. This may include performing statistical analysis of the data to categorize and identify a distribution across multiple categories. For example, for a dataset for which the feature gender is being examined, method 600 may determine the number of datapoints corresponding to the each of the categories available for gender (e.g., male, female, and other). The number of each category may then be compared to the total number of datapoints to calculate a percentage of the datapoints representing each category. Other features may require more complex analysis. For example, to determine distribution of skin tone in a dataset comprised of facial images, the images may first need to be processed to extract the skin tone information from them. Then based on the extracted information, the number of categories available for skin tone may be identified before the number of datapoints in each category can be calculated. In one implementation, a machine leaning model may be used in performing statistical analysis of the dataset to categorize and identify bias. In one implementation, the identified distribution is examined to determine whether the feature is balanced within a certain threshold. The threshold may be provided by the user or determined by the bias detection tool. Examining for bias and/or imbalanced data may also include identifying feature values that stand out as uncharacteristic or unusual as these values could indicated problems that occurred during data collection. In one implementation, any indication that certain groups or characteristics may be under or over represented relative to their real-world prevalence can point to bias or imbalance in data.

Once the dataset is examined and the distribution of the one or more identified features is determined, method 600 may proceed to provide a report of the findings to the user, at 625. This may be done by providing a written report identifying the distribution of the feature(s) across various categories and/or whether the distribution is balanced within a certain threshold. In another example, the report may be provided via a visualization interface that visualizes the distribution to make it easier to notice bias. For example, as discussed above, various types of charts may be used to visualize the distribution.

It should be noted that the bias detection tool may be hosted locally on the client (e.g., local bias detection engine) or remotely in the cloud (e.g., bias detection service). In one implementation, some a local bias detection engine is hosted locally, while others are stored in the cloud. This enables the client device to provide some bias detection operations even when the client is not connected to a network. Once the client connects to the network, however, the application may be able to provide better and more complete bias detection.

Thus, methods and systems for detecting imbalance in datasets associated with training a ML model are disclosed. The imbalance may result in introducing bias in the trained models and as such implicate a host of ethical, regulatory and/or policy issues. By detecting and reporting the imbalance to a user or a research before a trained model is deployed, the methods and systems may enable correction of the imbalance before a model is used in the real-world. This can improve the overall quality of ML models in addition to ensuring they comply with ethical, fairness, regulatory and policy standards.

Figure 7:
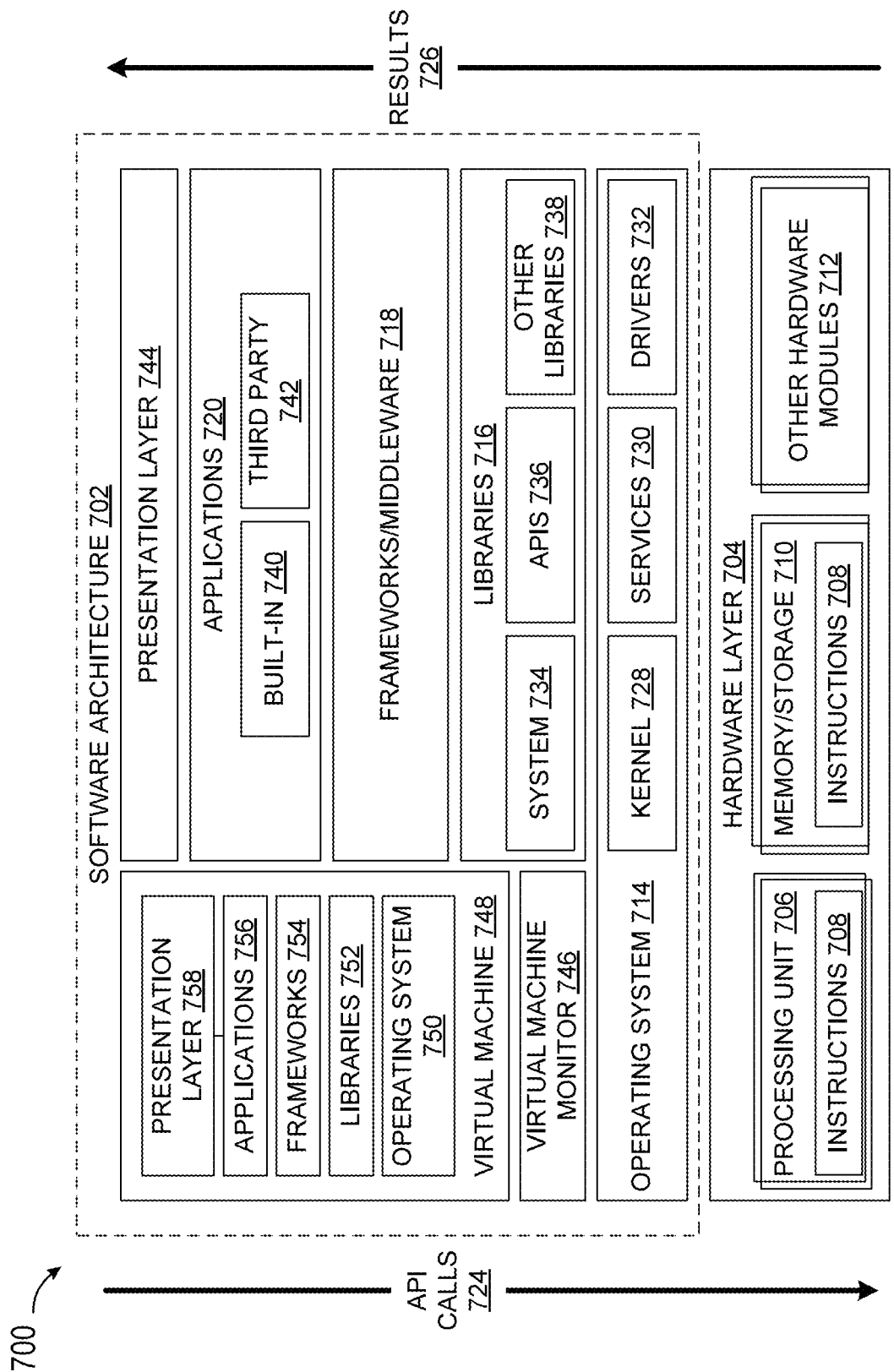
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture and it will be appreciated that many other architectures may be implemented to facilitate the functionality described herein. The software architecture 702 may execute on hardware such as client devices, native application provider, web servers, server clusters, external services, and other servers. A representative hardware layer 704 includes a processing unit 706 and associated executable instructions 708. The executable instructions 708 represent executable instructions of the software architecture 702, including implementation of the methods, modules and so forth described herein.

The hardware layer 704 also includes a memory/storage 710, which also includes the executable instructions 708 and accompanying data. The hardware layer 704 may also include other hardware modules 712. Instructions 708 held by processing unit 708 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various GUI functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 720 may include, but are not limited to, a contacts application, a browser application, a location application, a media application, a messaging application, and/or a game application. Third-party applications 742 may include any applications developed by an entity other than the vendor of the particular system. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 728 such as an OS 750, libraries 752, frameworks 754, applications 756, and/or a presentation layer 758.

Figure 8:
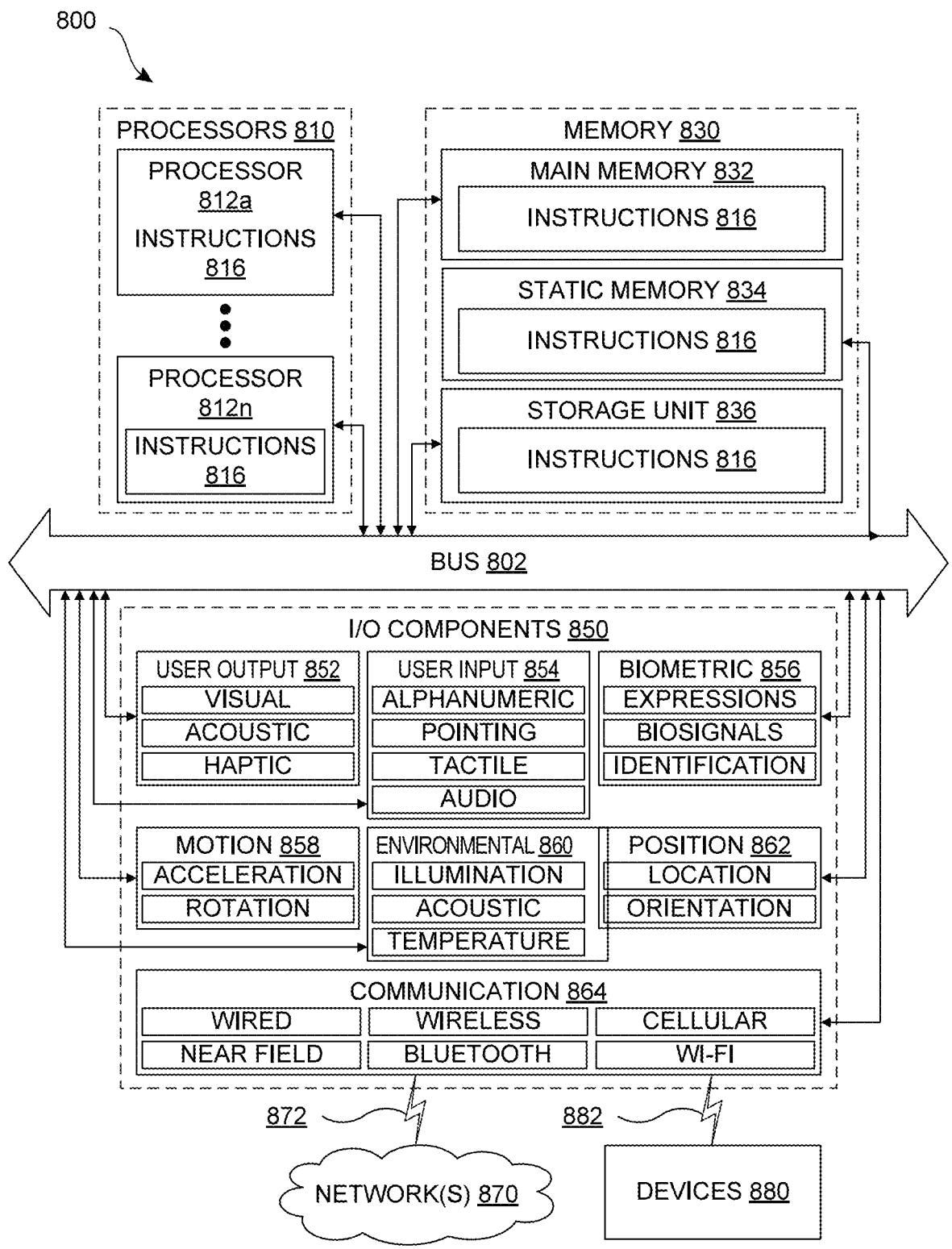
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement methods or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" include a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 916 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860 and/or position components 862, among a wide array of other environmental sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure.

It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by the processor, cause the data processing system to perform functions of:
   receiving a request via a selectable user interface element of a user interface screen associated with a data imbalance detection system to perform a data imbalance detection on a dataset associated with training a machine-learning (ML) model, the dataset being at least one of a training dataset used for training the ML model or an output dataset generated by the ML model;
   automatically identifying two or more features of the dataset for which data imbalance detection is to be performed based at least in part on a type of the ML model and one or more other parameters;
   performing a statistical analysis on the dataset to determine a distribution of for each of the two or more features across the dataset;
   correlating the distribution of at least one of the two or more features with the distribution of another one of the two or more features;
   transmitting data relating to the correlating of the distribution of at least one of the two or more features with the distribution of another one of the two or more features for visualizing the distribution of the at least one of the two or more features and the distribution of another one of the two or more features in a user interface element to help identify the data imbalance in the dataset,
   wherein:
      performing the statistical analysis on the dataset to determine the distribution for each of the two or more features includes determining the distribution for each of the two or more features across one or more categories available for each of the two or more features,
      the dataset includes at least one of the training dataset, a training subset of the training dataset, a validation subset of the training dataset, and the output dataset, and
      visualizing the distribution includes displaying the distribution on a visualization interface.

2. The data processing system of claim 1, wherein the request identifies the dataset on which the data imbalance detection is to be performed.

3. The data processing system of claim 1, wherein the data imbalance includes bias.

4. A method for detecting data imbalance in a dataset associated with training a machine-learning (ML) model, the method comprising:
   receiving a request via a selectable user interface element of a user interface screen associated with a data imbalance detection system to perform data imbalance detection on the dataset associated with training the ML model, the dataset being at least one of a training dataset used for training the ML model or an output dataset generated by the ML model;
   automatically identifying two or more features of the dataset for which data imbalance detection is to be performed based at least in part on a type of the ML model and one or more other parameters;
   performing a statistical analysis on the dataset to determine a distribution of for each of the two or more features across the dataset;
   correlating the distribution of at least one of the two or more features with the distribution of another one of the two or more features;
   transmitting data relating to the correlating of the distribution of at least one of the two or more features with the distribution of another one of the two or more features for visualizing the distribution of the at least one of the two or more features and the distribution of another one of the two or more features in a user interface element to help identify the data imbalance in the dataset,
   wherein:
      performing the statistical analysis on the dataset to determine the distribution for each of the two or more features includes determining the distribution for each of the two or more features across one or more categories available for each of the two or more features,
      the dataset includes at least one of the training dataset, a training subset of the training dataset, a validation subset of the training dataset, and the output dataset, and
      visualizing the distribution includes displaying the distribution on a visualization interface.

5. The method of claim 4, wherein the request identifies the dataset on which the data imbalance detection is to be performed.

6. The method of claim 4, wherein the data imbalance includes bias.

7. The method of claim 4, wherein the visualization interface includes a chart.

8. A non-transitory computer readable medium on which are stored instructions that, when executed cause a programmable device to:
   receive a request via a selectable user interface element of a user interface screen associated with a data imbalance detection system to perform a data imbalance detection on a dataset associated with training a machine-learning (ML) model, the dataset being at least one of a training dataset used for training the ML model or an output dataset generated by the ML model;
   automatically identify two or more features of the dataset for which data imbalance detection is to be performed based at least in part on a type of the ML model and one or more other parameters;
   perform a statistical analysis on the dataset to determine a distribution of for each of the two or more features across the dataset;
   correlate the distribution of at least one of the two or more features with the distribution of another one of the two or more features;
   transmit data relating to the correlating of the distribution of at least one of the two or more features with the distribution of another one of the two or more features for visualizing the distribution of the at least one of the two or more features and the distribution of another one of the two or more features in a user interface element to help identify the data imbalance in the dataset, wherein:
  performing the statistical analysis on the dataset to determine the distribution for each of the two or more features includes determining the distribution for each of the two or more features across one or more categories available for each of the two or more features,
  the dataset includes at least one of the training dataset, a training subset of the training dataset, a validation subset of the training dataset, and the output dataset, and
  visualizing the distribution includes displaying the distribution on a visualization interface.

9. The non-transitory computer readable medium of claim 8, wherein the request identifies the dataset on which the data imbalance detection is to be performed.

10. The non-transitory computer readable medium of claim 8, wherein the visualization interface includes a chart.

* * * * *